United States Patent
Bhanage et al.

(10) Patent No.: US 9,338,073 B2
(45) Date of Patent: May 10, 2016

(54) ENHANCED DYNAMIC MULTICAST OPTIMIZATION

(71) Applicant: Aruba Networks, Inc., Sunnyvale, CA (US)

(72) Inventors: Gautam Bhanage, Sunnyvale, CA (US);
Abhijeet Bhorkar, Milpitas, CA (US);
Sathish Damodaran, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 197 days.

(21) Appl. No.: 14/069,092

(22) Filed: Oct. 31, 2013

(65) Prior Publication Data
US 2015/0117235 A1   Apr. 30, 2015

(51) Int. Cl.
*H04L 12/26* (2006.01)
*H04L 12/18* (2006.01)

(52) U.S. Cl.
CPC .......... *H04L 43/0894* (2013.01); *H04L 12/185* (2013.01); *H04L 12/189* (2013.01)

(58) Field of Classification Search
None
See application file for complete search history.

(56) References Cited

U.S. PATENT DOCUMENTS

| | | | | |
|---|---|---|---|---|
| 8,064,446 B2 * | 11/2011 | Ramakrishnan | .... | H04L 12/1886 370/390 |
| 8,542,593 B1 * | 9/2013 | Kumar | .................. | H04L 1/0078 370/235 |
| 8,634,402 B2 * | 1/2014 | Kish | .................. | H04N 21/6405 370/312 |
| 2009/0168681 A1 * | 7/2009 | Moon | .......................... | 370/312 |
| 2011/0032832 A1 * | 2/2011 | Jalali | ...................... | H04L 47/10 370/252 |
| 2011/0211517 A1 * | 9/2011 | Moscibroda et al. | ......... | 370/312 |
| 2011/0216685 A1 * | 9/2011 | Kish | ...................... | H04H 20/71 370/312 |
| 2013/0272133 A1 * | 10/2013 | Yalagandula | ........... | H04L 45/16 370/238 |
| 2013/0276042 A1 * | 10/2013 | Savastianov | ........ | H04L 12/1881 725/95 |
| 2014/0192698 A1 * | 7/2014 | Anchan | ................... | H04W 4/06 370/312 |

FOREIGN PATENT DOCUMENTS

WO    WO 2013064175 A1 *  5/2013

* cited by examiner

*Primary Examiner* — Benjamin H Elliott, IV
*Assistant Examiner* — Eric Nowlin
(74) *Attorney, Agent, or Firm* — Hewlett Packard Enterprise Patent Department

(57) ABSTRACT

The present disclosure discloses a system and method for enhanced dynamic multicast optimization based on network condition measurement. The system includes a processor and a memory storing instructions that, when executed, cause the system to: measure a network condition for a multicast group using one or more metrics; determine whether to convert all stations in the multicast group to unicast based on the network condition; and responsive to determining not to convert the all stations in the multicast group to unicast, determine, based on the network condition, a sub set of the multicast group for converting the subset of the multicast group to unicast, wherein the subset includes less than all stations in the multicast group.

14 Claims, 9 Drawing Sheets

FIG. 9

NUMBER OF FLOWS CONVERTED WITH CHANGING RATE

LEGEND
- UNICAST FLOWS
- MULTICAST FLOWS

ENHANCED DYNAMIC MULTICAST OPTIMIZATION

FIELD

The present disclosure relates to optimizing multicast transmission in a wireless system. In particular, the present disclosure relates to a system and method for dynamically converting multicast transmission to unicast transmission based on network conditions measured by one or more metrics, wherein a partial multicast-unicast (MC-UC) conversion is possible.

BACKGROUND

Wireless medium is limited in bandwidth. To keep the medium clear, it is preferred to eliminate unnecessary multicast traffic when there is a need. Dynamic multicast optimization (DMO), which consumes less bandwidth by converting multicast traffic to unicast, ensures higher priority treatment for reliable over-the-air delivery.

In a current approach for DMO, a static threshold is predetermined to control the conversion from multicast to unicast. For example, a threshold for the number of subscribers (clients) associated with one access point (AP) is preset and only if the number of subscribers of the multicast traffic is fewer than the threshold, the approach converts the multicast traffic to unicast. The threshold based approach simplifies the process and might results in decent performance in simple scenarios.

The threshold based approach, nevertheless, suffers significant challenges. This approach, which is load ignorant even if the number of clients is fewer than the preset threshold, is, therefore, incapable of adapting to time varying traffic load and can result in unintentional deterioration in performance (e.g., increased delay and jitter) when the overall traffic increases. Specifically, for real time multicasts, where delay and jitter play an important role in determining quality of a call or reception of video, link adaption with change in perceived load is a must. Further, due to bursty and continuous time varying traffic, it is inherently difficult for the threshold based approach to predict the load and preset the threshold accordingly. It is not possible to set even a conservative threshold since it may result in counter-productive performance under different network loads.

Moreover, with the advent of 802.11ac links, the coexistence of legacy clients will result in a higher disparity in client capabilities and this need to be taken into account while deciding when a multicast group can be converted to unicast. The current approach also does not take Quality of Service (QoS) into account. For all types of multicast traffic, the current approach makes a conversion decision in the same fashion, which can degrade performance for video or voice multicasts. Furthermore, the current approach does not take interference or link quality to clients into account.

Typically, clients (stations) associate with one multicast group have different capabilities in terms of transmission rates, physical locations and link qualities, etc. Thus, a mechanism which is able to account for these aspects will be able to benefit from the information.

BRIEF DESCRIPTION OF THE DRAWINGS

The present disclosure may be best understood by referring to the following description and accompanying drawings that are used to illustrate embodiments of the present disclosure.

FIG. 9 is a graphic representation illustrating another experimental result of implementing enhanced dynamic multicast optimization according to embodiments of the present disclosure.

DETAILED DESCRIPTION

Figure 1:
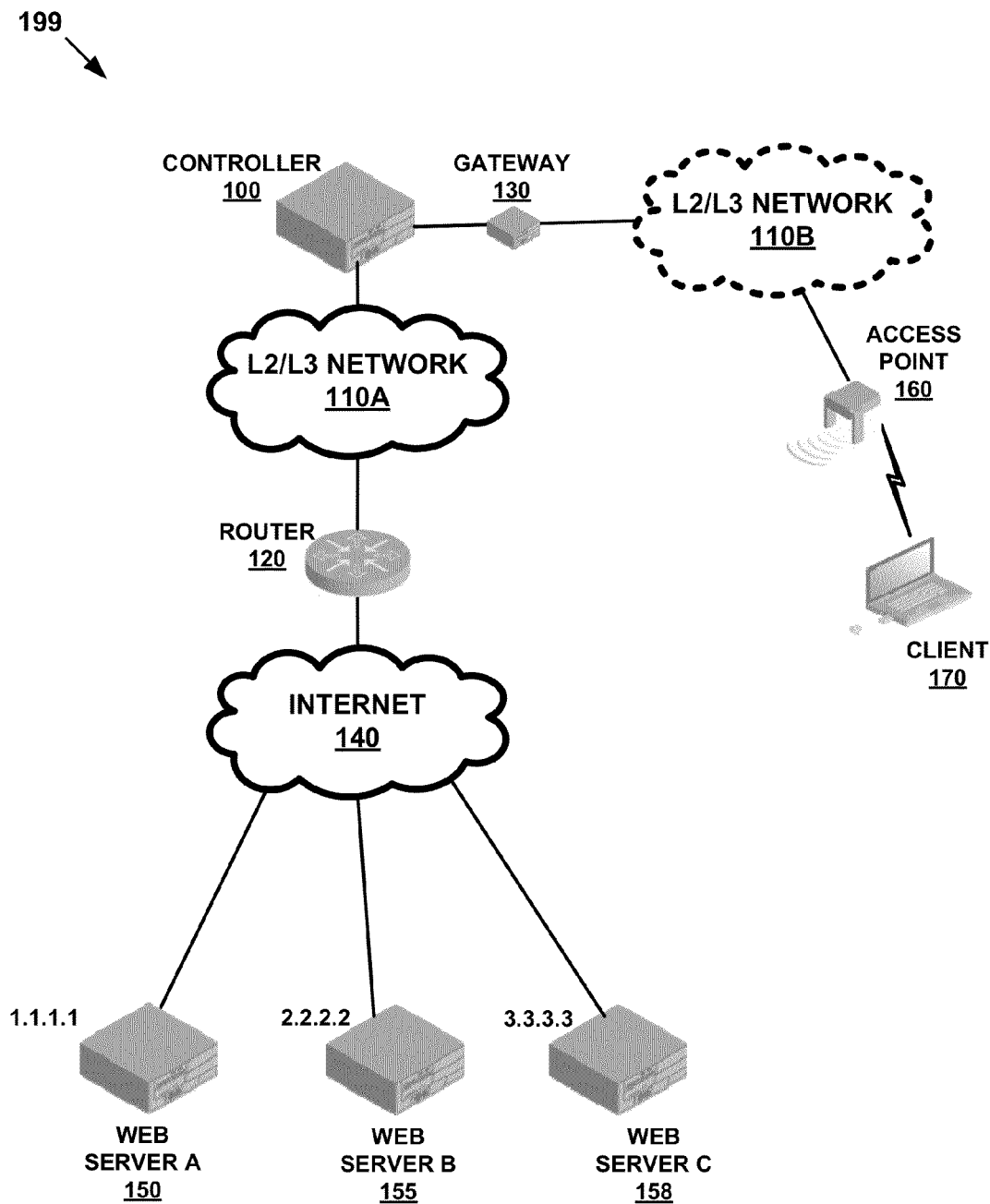
FIG. 1 is a block diagram illustrating an exemplary network environment according to embodiments of the present disclosure.

In the following description, several specific details are presented to provide a thorough understanding. While the context of the disclosure is directed to an enhanced dynamic multicast optimization, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to an enhanced dynamic multicast optimization (EDMO). In particular, the present disclosure relates to a system and method for dynamically converting multicast transmission to unicast transmission based on network conditions measured by one or more metrics, wherein a partial multicast-unicast (MC-UC) conversion is beneficially implemented when a full MC-UC conversion will cause saturation.

Specifically, the system and method optimize the MC-UC conversion by dynamically measuring network conditions and converting only a portion of multicast traffic to unicast if the network link does not have enough capacity to accommodate all unicast traffic. In one embodiment, the present disclosed partial MC-UC conversion system and method achieves improved network reliability especially under conditions with heavy loads, by converting slower clients to unicast and keeping multicast transmission for faster clients if there is no enough link capacity, which provides a benefit in the usage of the link. In another embodiment, the present disclosed partial MC-UC conversion system and method converts only faster clients to unicast while keeping slower clients as a part of the multicast group in cases where link utilization needs more attention than link reliability. An alternative criterion for determining a partial MC-UC conversion can be used by the disclosed system and method. For example, the system and method can use presence of clients with bad wireless links that are a part of the multicast traffic as an indication of a partial MC-UC conversion.

The present disclosed system and method also convert voice/video (VO/VI) type multicast traffic more aggressively to unicast than Background/Best Effort (BK/BE) tagged traffic flows, which will improve overall wireless local area network (WLAN) performance. Alternatively, the present disclosed system and method can be designed to ensure that a system administrator can orchestrate conversion behavior independently for different access categories.

According to embodiments of the present disclosure, the conventional dynamic multicast optimization (DMO) based on a static threshold to control a multicast-unicast conversion is enhanced by using one or more network condition metrics to measure the time varying network conditions and implementing a full or partial multicast-unicast transmission conversion based on the measurement. The present disclosure allows for capturing the up-to-date network traffic and different Quality of Service (QoS) requirements among different multicast traffics, and thus not only enhances the conventional static threshold based DMO to network condition measurement based dynamic multicast optimization, but also allows consideration of QoS when implementing the multicast-unicast transmission conversion.

Specifically, with the solution provided herein, a disclosed network device measures a network state (e.g., airtime usage) for multicast transmission in a network group, and estimates another network state (e.g., airtime usage) for the group if all stations are converted to unicast transmission. The airtime is a metric that indicates the state of the network. Airtime information encompasses the network state with respect to interference, the physical layer (PHY) rate, client proximity, frame retries, station capabilities, etc. Other metrics can be also used to measure the network conditions. For example, the other metrics include the load of the multicast group, the overall load on the LAN, the PHY rates of the clients (stations) in the multicast group, station capabilities, Overlapping Basic Service Set (OBSS) load, etc.

Further, the disclosed network device compares the two network states for multicast and unicast. For example, the disclosed network device determines if the unicast transmission is cheaper than multicast transmission in terms of airtime usage. If so, the network device converts the multicast transmission to unicast transmission for the stations in the multicast group. In some embodiments, if the network device determines that the unicast transmission is not cheaper than multicast transmission, the network device then determines if the unicast conversion will cause saturation of the network link. In other words, the network device determines if the unicast transmission of all stations overloads the network link.

If the disclosed network device determines that the unicast conversion will cause saturation of the network link, then the network device determines that a full multicast to unicast conversion is not possible and thus initiates a partial multicast to unicast conversion procedure.

For a partial multicast to unicast conversion process, in some embodiments, the disclosed network device sorts the stations in the multicast group based on their transmission rates and determines a subset of the multicast group by removing one or more stations with the highest rate or the lowest rate in each round until the overload is eliminated. The network device converts the stations in the subset from multicast to unicast transmission pattern.

In some embodiments, the partial multicast to unicast conversion procedure can be done in other ways. For example, heuristics or solutions used for solving bin-packing algorithms and/or the knapsack algorithm can be used to determine the subset of the multicast group to be converted to unicast.

In some embodiments, the disclosed network device sorts multicast groups based on their priorities. Specifically, the network device sorts the multicast groups based on the priority of their access categories. For example, voice multicasts have a higher priority than video multicasts. Other criteria are possible. For example, the sorting of the multicast groups can be based on one or more of the aggregate number of stations (or clients) in one group, the individual or average transmission rates of stations (or clients) in one group, the IP source of the traffic, membership of certain VAPs on the AP of one group, the average load sustained by one group, other past usage characteristics, etc.

In some embodiments, optionally the disclosed network device selects an optimized multicast rate for stations in a multicast group. For example, the network device determines the minimum of the stations' unicast transmission rates (referred to as the minimum station unicast rate) and then selects the maximum of the minimum station unicast rate and a preconfigured rate value. The minimum station unicast rate is the unicast rate of the slowest client (station). The optimized multicast rate can also be selected using any other appropriate methods, which one skilled in the relevant art will recognize.

The present disclosed system and method for EDMO can be implemented with any existing DMO framework. Additional information that is needed by the EDMO system and method to determine a MC-UC conversion can be made available in the existing framework. For example, the needed information including the number of associated stations in a multicast group and a data rate used by a client (station) is already made available in the existing framework.

Computing Environment

FIG. 1 shows an exemplary digital network environment 199 according to embodiments of the present disclosure. FIG. 1 includes at least one or more network controller (such as controller 100), one or more access points (such as access point 160), one or more client devices (such as client 170), a layer 2 or layer 3 network 110, a routing device (such as router 120), a gateway 130, Internet 140, and one or more web servers (such as web server A 150, web server B 155, and web server C 158), etc. The components of the digital network environment 199 are communicatively coupled to each other. In some embodiments, the digital network environment 199 may include other components not shown in FIG. 1 such as an email server, a cloud-based storage device, etc.

The controller 100 is a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

Moreover, assuming that a number of access points, such as access point 160, are interconnected with the network controller 100. Each access point 160 may be interconnected with zero or more client devices via either a wired interface or a wireless interface. In this example, for illustration purposes only, assuming that the client 170 is associated with the access point 160 via a wireless link. An access point 160 generally refers to a network device that allows wireless clients to connect to a wired network. Access points 160 usually connect to a controller 100 via a wired network or can be a part of a controller 100 in itself. For example, the access point 160 is connected to the controller 100 via an optional L2/L3 network 110B

Furthermore, the controller 100 can be connected to the router 120 through zero or more hops in a layer 3 or layer 2 network (such as L2/L3 Network 110A). The router 120 can forward traffic to and receive traffic from the Internet 140. The router 120 generally is a network device that forwards data packets between different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the Internet 140 until the packet gets to its destination.

The gateway 130 is a network device that passes network traffic from local subnet to devices on other subnets. In some embodiments, the gateway 130 may be connected to a controller 100 or be a part of the controller 100 depending on the configuration of the controller 100.

Web servers 150, 155, and 158 are hardware devices and/or software modules that facilitate delivery of web content that can be accessed through the Internet 140. For example, the web server A 150 may be assigned an IP address of 1.1.1.1 and used to host a first Internet website (e.g., www.yahoo.com); the web server B 155 may be assigned an IP address of 2.2.2.2 and used to host a second Internet website (e.g., www.google.com); and, the web server C 158 may be assigned an IP address of 3.3.3.3 and used to host a third Internet website (e.g., www.facebook.com).

The client 170 may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. Although only one client 170 is illustrated in FIG. 1, a plurality of clients 170 can be included in FIG. 1.

System for Enhanced Dynamic Multicast Optimization

Figure 2:
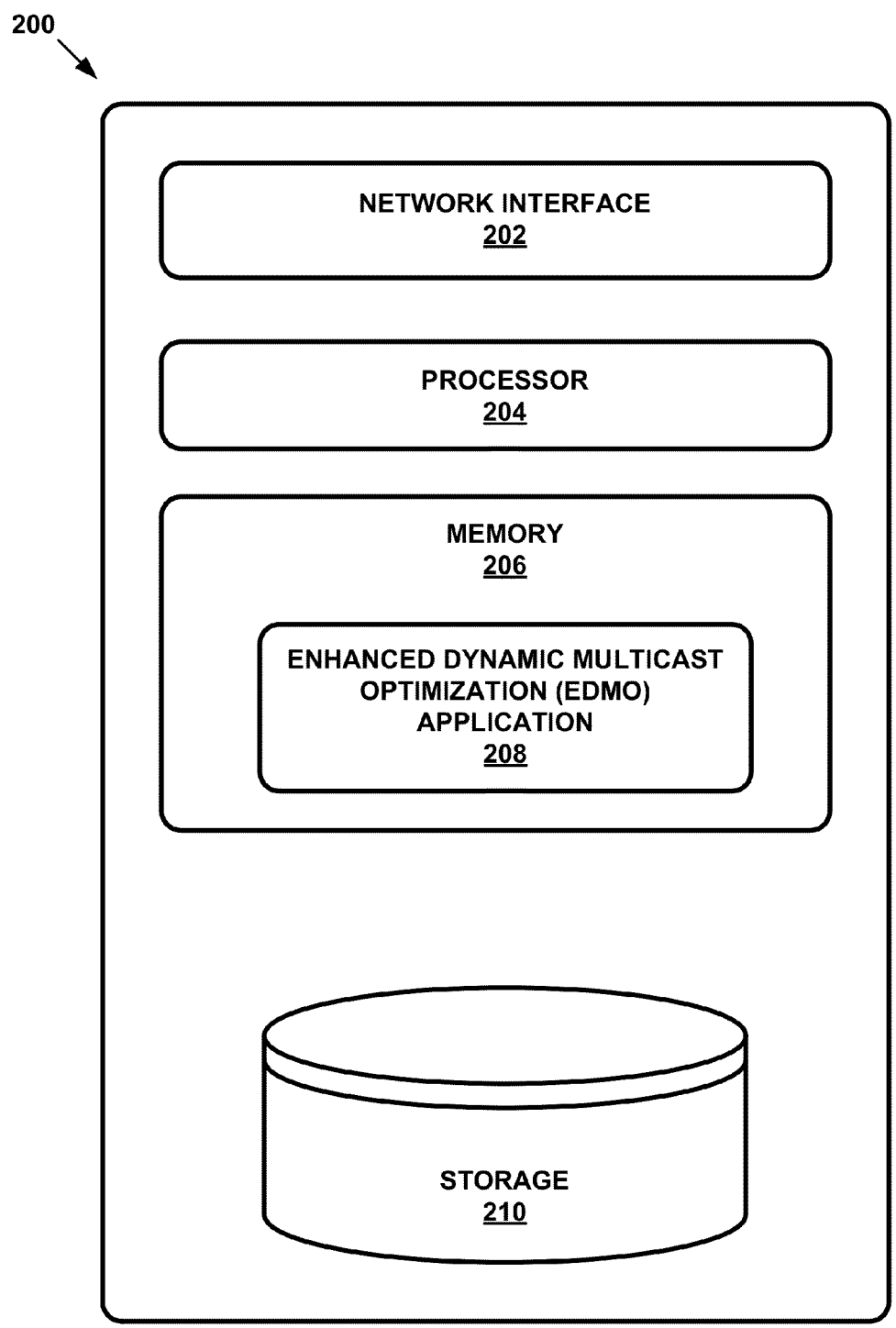
FIG. 2 is a block diagram illustrating a network device system of enhanced dynamic multicast optimization according to embodiments of the present disclosure.

FIG. 2 is a block diagram illustrating an example network device system 200 for enhanced dynamic multicast optimization according to embodiments of the present disclosure. The network device 200 may be used as a network switch, a network router, a network controller, a network server, an access point (AP), etc. For example, the network device 200 may be an access point or a controller that is communicatively coupled by one or more clients (or stations). For purposes of clarity and conciseness, one or more subscribed clients (or stations) communicatively coupled to one access point may be referred to, herein, as a "group." Similarly, one or more access points communicatively coupled to one controller may also be referred to, herein, as a "group." Further, a group performing multicast transmission may be referred to, herein, as a "multicast group." In some embodiments, a group can be dynamic, which means clients (or stations) can join and withdraw from the group associated with an access point dynamically and thus the traffic flows in the group are time varying. Access points can also join and withdraw from a group associated with a controller dynamically, which causes time varying traffic flows too. A multicast group can also be referred to as a multicast flow group.

According to embodiments of the present disclosure, network services provided by the network device 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. In some embodiments, the network device 200 may serve as a node in a distributed or a cloud computing environment.

In the illustrated embodiments, the network device 200 includes at least one network interface 202 capable of communicating to a wired network, a processor 204, a memory 206 and a storage device 210. The components of the network device 200 are communicatively coupled to each other.

Network interface 202 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 202 may be software-defined and programmable, for example, via an Application Programming Interface (API), and thus allowing for remote control of the network device 200.

Processor 204 includes an arithmetic logic unit, a microprocessor, a general purpose controller or some other processor array to perform computations and provide electronic display signals to a display device. Processor 204 processes data signals and may include various computing architectures including a complex instruction set computer (CISC) architecture, a reduced instruction set computer (RISC) architecture, or an architecture implementing a combination of instruction sets. Although FIG. 2 includes a single processor 204, multiple processors 204 may be included. Other processors, operating systems, sensors, displays and physical configurations are possible. In some embodiments, processor 204 includes a networking processor core that is capable of processing network data traffic.

Memory 206 stores instructions and/or data that may be executed by processor 204. The instructions and/or data may include code for performing the techniques described herein. Memory 206 may be a dynamic random access memory (DRAM) device, a static random access memory (SRAM) device, flash memory or some other memory device. In some embodiments, memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, an enhanced dynamic multicast optimization (EDMO) application 208 is stored in memory 206. The enhanced dynamic multicast optimization application 208 can be the code and routines that, when executed by processor 204, cause the network device 200 to implement an enhanced dynamic multicast optimization among multicast groups. As described above, a multicast group can include one or more subscribed clients (or stations) associated with one access point that deals with multicast transmission traffic. Alternatively, a multicast group can also be a group including one or more access points associated with one controller that deals with multicast transmission traffic.

Although not shown in Figures, in some embodiments, the enhanced dynamic multicast optimization application 208 can be implemented using hardware including a field-programmable gate array (FPGA) or an application-specific integrated circuit (ASIC). In some embodiments, the enhanced dynamic multicast optimization application 208 can be implemented using a combination of hardware and software. In some embodiments, the enhanced dynamic multicast optimization application 208 may be stored in a combination of more than one network devices, or in one of the network devices. The enhanced dynamic multicast optimization application 208 is described below in more detail with reference to FIGS. 3-7.

Storage device 210 can be a non-transitory memory that stores data for providing the functionality described herein. Storage device 210 may be a dynamic random access memory (DRAM) device, a static random access memory (SRAM) device, flash memory or some other memory devices. In some embodiments, storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Enhanced Dynamic Multicast Optimization Application

Figure 3:
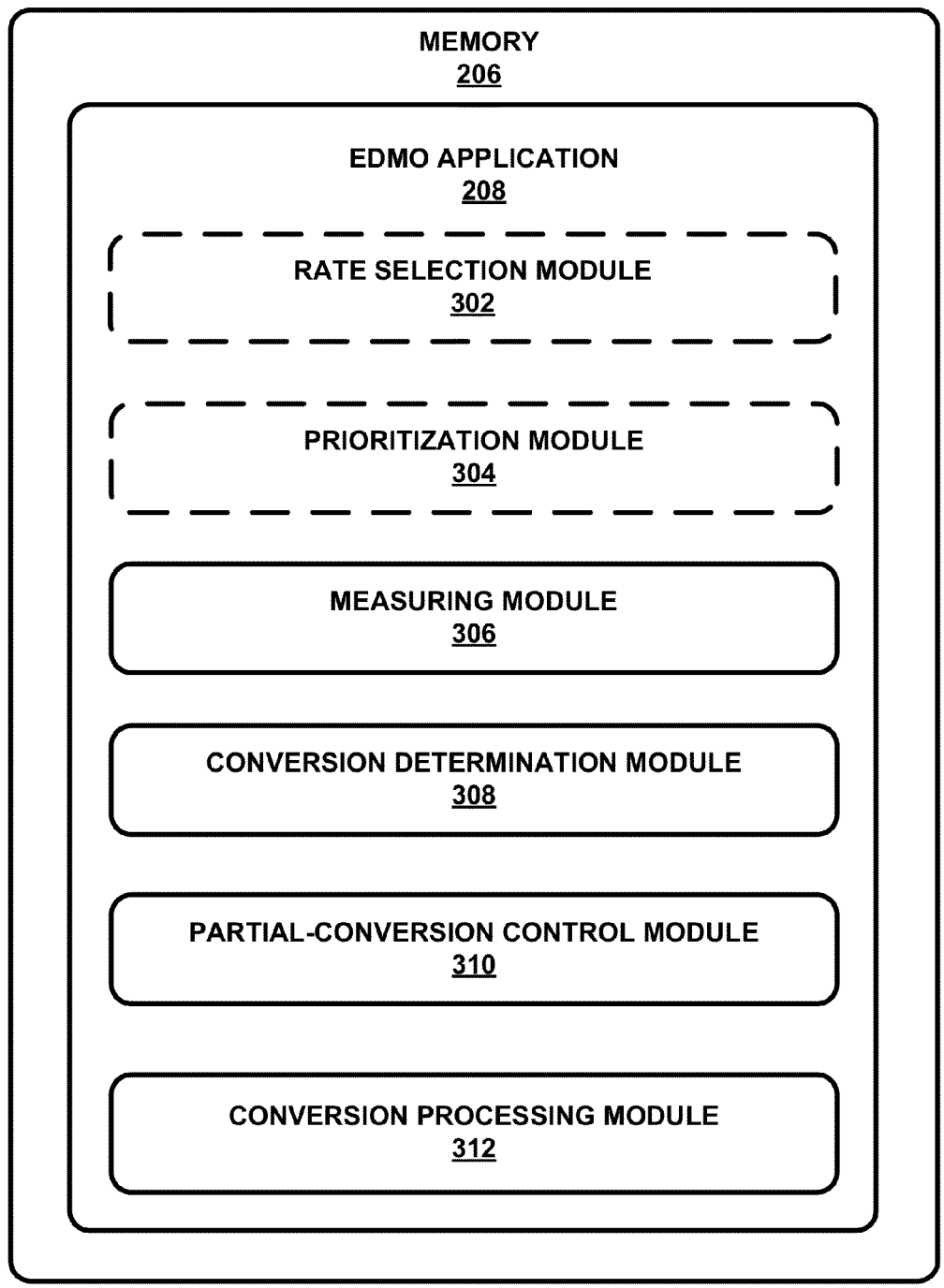
FIG. 3 is a block diagram illustrating an exemplary enhanced dynamic multicast optimization application stored on a memory according to embodiments of the present disclosure.

FIG. 3 illustrates an exemplary enhanced dynamic multicast optimization (EDMO) application 208 according to embodiments of the present disclosure. The enhanced dynamic multicast optimization application 208 includes a rate selection module 302 and a prioritization module 304 which are optional, a cost estimation module 306, a conversion determination module 308, a partial-conversion control module 310 and a conversion processing module 312.

The rate selection module 302 can be software including routines for selecting an optimized data rate for a multicast group. In some embodiments, the rate selection module 302 can be a set of instructions executable by processor 204 to provide the functionality described below for selecting an optimized data rate for a multicast group. In some other embodiment, the rate selection module 302 can be stored in memory 206 of the network device 200 and can be accessible and executable by processor 204. The rate selection module 302 may be adapted for cooperation and communication with processor 204 and other components of the network device 200 such as network interface 202, storage 210, etc.

The rate selection module 302 can be an optional module in the EDMO application 208 and performs optional or additional functionality for the enhanced dynamic multicast optimization. In some embodiments, the rate selection module 302 identifies a multicast group and selects an optimized multicast data rate for the multicast group. An optimized multicast data rate for a multicast group can be a data rate that works best for the multicast group in terms of channel bandwidths, loads, etc. In some embodiments, an optimized multicast data rate for a multicast group can be determined by data rates of the clients (stations) in the multicast group. For example, an optimized multicast data rate can be limited by the data rate of the slowest clients (or stations) in the multicast group. In some embodiments, the rate selection module 302 retrieves data rate statistics data from other components (not shown in Figures) of the network device and determines stations' data rate based on the statistics data.

The optimized multicast data rate for the multicast group can then be determined based on the stations' data rate. For example, an optimized multicast data rate can be calculated using the following equation:

$$\text{Rate}_{mcast} = \max(\min(\text{Rate}_{sta}(1 \ldots N)), \text{Rate}_{preset}), \quad (1)$$

wherein, $\text{Rate}_{mcast}$ represents the optimized multicast data rate, $\text{Rate}_{sta}(1 \ldots N)$ represents each station's unicast data rate, N represents the number of stations (or clients) in the multicast group and $\text{Rate}_{preset}$ represents a preconfigured data rate value for the Virtual Access Point (VAP)/Service Set Identification (SSID) profile.

Based on the above described equation (1), the rate selection module 302 determines an optimized multicast data rate for the multicast group. Specifically, the rate selection module 302 determines the minimum of all stations' unicast data rates in the multicast group (as referred to as the minimum station unicast rate, e.g., the unicast data rate of the slowest client in the group), and selects the larger one of the minimum station unicast rate and a preconfigured data rate as the optimized multicast data rate for the multicast group. The preconfigured data rate can be predetermined based on the SSID profile or other possible criteria.

The optimized multicast data rate can also be determined by other approaches. In some embodiments, the rate selection module 302 uses a fraction of the minimum station unicast rate as the multicast data rate for the group. In some embodiments, the rate selection module 302 compares a half of the value of the minimum station unicast rate with a preset value (e.g., 24 Mbps) and chooses the smaller one of them.

The prioritization module 304 can be software including routines for sorting multicast flow groups based on priority or other criteria. In some embodiments, the prioritization module 304 sorts multicast groups based on priority of their access categories. For example, a multicast group transmitting voice data has a higher priority than a multicast group transmitting video data. In some embodiments, the prioritization module 304 sorts multicast groups based on one or more criteria including the aggregate number of clients (or stations) in each group, the data rates of clients (or stations) of each group, where the traffic flows come from (e.g., the IP source), membership of certain VAPs on the AP of each multicast group, the average loads sustained by the multicast groups, other past usage characteristics, etc. The prioritization module 304 is an optional module in the EDMO application 208.

The measuring module 306 can be software including routines for measuring or estimating network conditions using one or more metrics. One skilled in the relevant art will recognize that the one or more metrics can include any appropriate metric that can be used to detect network conditions. In some embodiments, the measuring module 306 measures dynamic network conditions using airtime information. Airtime information indicates the state of network with respect to interference, PHY rates, client proximity, frame retries, station capabilities, etc. Other metrics can be used to measure the network conditions. For example, the other metrics include the load of the multicast group, the overall load on the LAN, the PHY rates of the clients (stations) in the multicast group, station capabilities, Overlapping Basic Service Set (OBSS) load, etc. The airtime information or other measurement data based on other metrics can then be sent by the measuring module 306 to the conversion determination module 308 for determining if a full multicast to unicast conversion is possible based on the airtime information or the other measurement data, e.g., based on if the airtime information indicates a saturation of link or not.

Specifically, the measuring module 306 measures a total airtime usage (cost) for a multicast flow group, which is the airtime usage (cost) of all multicast flows in the group. In some embodiments, the measuring module 306 calculates the total airtime cost for multicast transmission of a group using an equation as below:

$$\text{Airtime}_{mcast} = \text{Rate}_{mcast} \times \text{Load}_{mcast}, \quad (2)$$

wherein, $\text{Airtime}_{mcast}$ represents the total airtime cost for the multicast group; $\text{Rate}_{mcast}$ represents a multicast data rate for the group, which, e.g., can be the optimized multicast data rate for the group; $\text{Load}_{mcast}$ represents load of the multicast flow group. Therefore, the measuring module 306 calculates the total airtime cost for multicast transmission of a multicast group by multiplying the multicast data rate of the group by the load of the group. Equation (2) is one exemplary method for measuring the total airtime cost for multicast transmission of a multicast group and one skilled in the relevant art will recognize that other methods are available.

The measuring module 306 also estimates airtime cost as the entire multicast transmission of stations in the group is converted to unicast transmission. For example, the measuring module 306 uses the following equation to do the estimation. The equation is described below:

$$\text{Airtime}_{ucast} = \sum_{i=1}^{n} \left( (\text{Rate}_{sta}(i) \times \text{Load}_{mcast}) \times \left(1 + \frac{\text{RetriesPS}_{sta}(i)}{\text{PPS}_{sta}(i)}\right)\right), \quad (3)$$

wherein, $\text{Airtime}_{ucast}$ represents the airtime cost for unicast transmission of the group; n represents the number of stations in the group; i is an index for a station in the group; $\text{Rate}_{sta}(i)$ represents the data rate of the station with index i; $\text{Load}_{mcast}$ represents load of the group; $\text{RetriesPS}_{sta}(i)$ represents a measure of the number of retries seen for the station i per second; $\text{PPS}_{sta}(i)$ represents the number of packets for the station i per second. Therefore, based on the equation (3), the measuring module 306 estimates the airtime cost for all stations in the group if converted to unicast.

The measuring module 306 can then send the measured total airtime cost for multicast transmission of the multicast group and the estimated airtime cost for all stations in the group if converted to unicast transmission to the conversion determination module 308 to determine if a full MC-UC conversion is possible.

Other metrics for measuring network conditions can be used to control a multicast-unicast conversion. For example, the measuring module 306 can monitor presence of one or more clients with bad wireless links as a part of the multicast transmission. In some embodiments, the measuring module 306 measures if bad wireless links appear based on detection data from other components of the network device 200. If there are bad wireless links, the measuring module 306 sends information indicating the presence of bad wireless links from the measurement to the partial-conversion control module 310 for controlling a partial MC-UC conversion. For example, clients (stations) having bad wireless links as a part of multicast traffic can be converted to unicast.

The conversion determination module 308 can be software including routines for determining whether to implement a full MC-UC conversion for a multicast group. The conversion determination module 308 receives measurements for the current network conditions from the measuring module 306 and determines if a full MC-UC conversion is possible based on the current network conditions. If a full MC-UC conversion is determined to be possible, the conversion determination module 308 triggers the full MC-UC conversion for the group.

Specifically, in some embodiments, the conversion determination module 308 receives calculated airtime costs (e.g., the total airtime cost for multicast, the airtime cost for all stations if converted to unicast) and determines if unicast transmission is cheaper in terms of airtime cost. For example, the conversion determination module 308 compares the total airtime cost for multicast with the airtime cost for all stations if converted to unicast and determines which one is lower. If the unicast transmission is determined to be cheaper based on the current measurements, the conversion determination module 308 can then determine to convert all flows in the multicast group to unicast transmission. The conversion determination module 308 can trigger the conversion processing module 312 to implement the MC-UC conversion for all stations in the group.

In some embodiments, if the unicast conversion is determined to be not cheaper in terms of airtime cost, the conversion determination module 308 further determines if the unicast conversion for all stations will cause saturation of the link. A saturated network link can be a link that transmits more data than is possible. In other words, saturation indicates transmission of data is beyond the capacity of the link. Therefore, if saturation will be caused by the unicast conversion for all stations, the conversion determination module 308 determines that a full MC-UC conversion is not possible. The conversion determination module 308 will trigger the partial-conversion control module 310 to determine if a subset of multicast flows can be made reliable.

In some embodiments, the MC-UC conversion determination processes for multicast groups can by implemented via the cooperation of the measuring module 306 and the conversion determination module 308 in the order determined by the prioritization module 304. For example, voice multicasts will be tried to be converted to unicasts prior to video multicasts since voice data has a higher priority than video data in terms of category.

The partial-conversion control module 310 can be software including routines for controlling a partial MC-UC conversion for a multicast group. The partial-conversion control module 310 can be triggered when a full MC-UC conversion will cause saturation. Thus, in one embodiment, the partial-conversion control module 310 can sort clients (stations) in the multicast group from the slowest to the fastest and accommodate slower clients first while adding as many faster clients as possible. In other words, the partial-conversion control module 310 controls to convert part of the multicast group to unicast transmission with slower clients (stations) having a higher priority. This approach ensures that for clients (stations) with poor links, a reliable communication can still be possible while not affecting overall group performance associated with one access point.

Specifically, in some embodiments, the partial-conversion control module 310 generates a conversion target set including one or more clients (stations) sorted from slowest to fastest. For example, initially, the partial-conversion control module 310 can sort all clients (stations) in one multicast group based on their speeds (data rates) and determine a conversion target set including all clients (stations) in the multicast group but the fastest one or more clients (stations). Then the partial-conversion control module 310 tests if converting clients (stations) in the conversion target set will cause saturate of the links and removing one or more stations (e.g., the fastest in the set) from the conversion target set accordingly.

In some embodiments, the partial-conversion control module 310 tests if converting clients (stations) in the conversion target set will cause saturation of the link by estimating airtime cost of multicast transmission and of unicast transmission of clients (stations). For example, the partial-conversion control module 310 estimates airtime cost of multicast transmission for one or more clients (stations) that are not in the conversion target set and estimates airtime cost of unicast transmission for one or more clients (stations) in the target set. The partial-conversion control module 310 can estimate the airtime cost of multicast transmission and the airtime cost of unicast transmission of stations in the conversion target set using equations similar to the equations (2) and (3) described above. The partial-conversion control module 310 can use the group multicast data rate when calculating the airtime costs.

In some embodiments, the partial-conversion control module 310 calculates a total airtime cost using the multicast and unicast airtime costs and determines if the total airtime cost will saturate the link. If the cost will saturate the link, the partial-conversion control module 310 removes one or more fastest client (station) from the conversion target set, estimates a new airtime cost for the updated conversion target set and tests if the new airtime cost will cause saturation. If so, the partial-conversion control module 310 repeats the process until at some point a calculated airtime cost will not cause saturation of the link or until there is no any client (station) in the conversion target set.

If after the process there is no any client (station) in the conversion target set, it indicates that even converting one client (station) from multicast to unicast will cause saturation and there is no possibility to do even a partial MC-UC conversion. If this is the case, the partial-conversion control module 310 will end the process and retrieve relevant data for the next multicast group for testing the partial MC-UC conversion possibility for the next group.

If during the process a calculated airtime cost is determined not to cause saturation of the link at some point, the partial-conversion control module 310 will determines the current conversion target set as the set to implement a partial MC-UC conversion. In other words, the partial-conversion control module 310 will convert the one or more clients (stations) in the current conversion target set from multicast transmission to unicast transmission. For example, the partial-conversion control module 310 can instruct the conversion processing module 312 to convert each client (station) in the current target set from multicast to unicast. In some embodiments, the partial-conversion control module 310 will test if the multicast data rate for the group can be improved after the conversion. In some embodiments, after the partial MC-UC conversion for the multicast group, the partial-conversion control module 310 ends the process and retrieves relevant data for the next multicast group for testing the partial MC-UC conversion possibility for the next group.

In one embodiment, under conditions where link utilization is more important than link reliability, the partial-conversion control module 310 gives priority to faster clients and converts faster clients (stations) in the multicast group to unicast transmission while keeping slower clients (stations) as a part of the multicast group. For example, in a similar frame of approach described above, the partial-conversion control module 310 removes one or more slowest clients (stations) from the conversion target set when there is not enough link capacity. Therefore, finally the conversion target set includes one or more the fastest clients (stations) in the multicast group. The partial-conversion control module 310 then controls to convert the one or more fastest clients to unicast.

Other mechanisms can also be used to control a partial multicast to unicast conversion. In some embodiments, the partial-conversion control module 310 controls the partial MC-UC conversion using solutions for solving bin-packing algorithm and/or the knapsack algorithm. A knapsack problem can be described as the following:

$$\text{Maximize: } \Sigma_{i=1}^{N} STA_{mcast}(i), \text{ Subject to: } STA_{mcast} \times rate_{matrix} \times mcast_{load} \leq 1, \quad (5)$$

wherein, N is defined as the total clients (stations) in the WLAN; the STA vector $STA_{mcast}$ includes elements $STA_{mcast}(i)$ and $STA_{mcast}(i)$ indicates if the client (station) with index i is selected for unicast conversion, wherein a value "0" indicates that the client (station) is not selected and a value "1" indicates that the client (station) is selected; $rate_{matrix}$ includes data rates of the clients (stations) of the multicast group; $mcast_{load}$ represents load of the multicast group.

Other parameters used to solve the knapsack problem for partial MC-UC conversion can be defined. For example, these parameters include a preset multicast data rate used by the WLAN; the number of clients (stations) participating in the multicast considered for the enhanced dynamic multicast optimization problem; the data rate of the multicast traffic; a last known PHY rate to clients (stations); airtime allocation on the radio for other traffic; an estimated airtime usage for multicast traffic to the client (station) under consideration; an estimated airtime usage if the multicast group is converted entirely to unicast transmission; etc.

In some embodiments, the partial-conversion control module 310 receives bad link information indicating the presence of clients (stations) with bad wireless links and control a partial MC-UC conversion for the clients (stations) with bad wireless links.

The conversion processing module 312 can be software including routines for converting multicast flows to unicast under the control of either the conversion determination module 308 or the partial-conversion control module 310. In some embodiments, the conversion processing module 312 receives instructions from the conversion determination module 308 to facilitate a full MC-UC conversion. In some embodiments, the conversion processing module 312 receives the conversion target set including clients (stations) to be converted to unicast from the partial-conversion control module 310 and convert the target set from multicast to unicast. In some embodiments, the conversion processing module 312 performs other functionalities helpful for a full or partial MC-UC conversion.

Processes for Enhanced Dynamic Multicast Optimization

Figure 4:
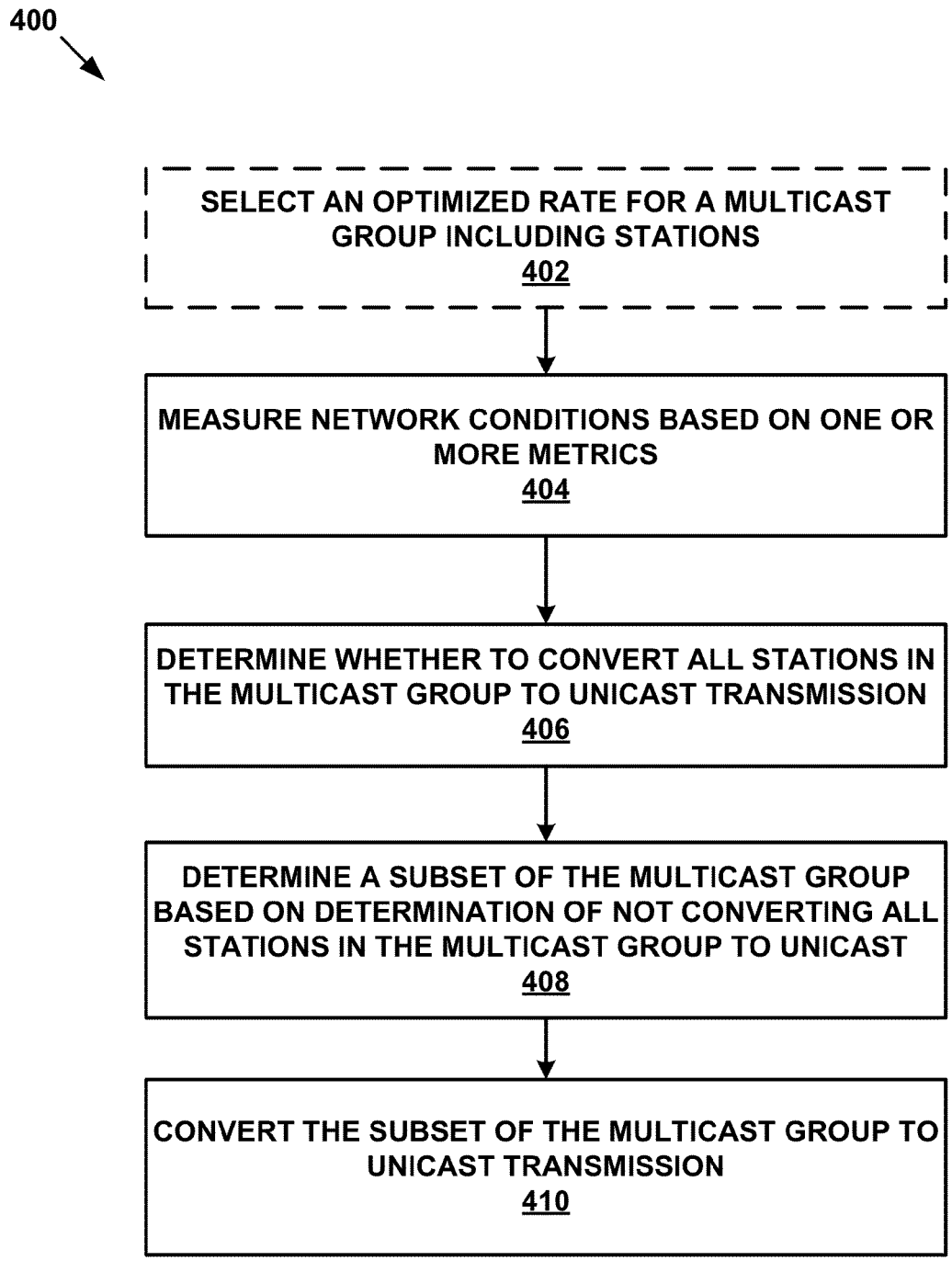
FIG. 4 illustrates an exemplary enhanced dynamic multicast optimization process according to embodiments of the present disclosure.

FIG. 4 is a flowchart illustrating an exemplary process 400 for enhanced dynamic multicast optimization (EDMO) according to embodiments of the present disclosure. Specifically, FIG. 4 illustrates an exemplary process 400 for enhanced dynamic multicast optimization (EDMO) in which a full or partial MC-UC conversion is determined based on measured network conditions. During operation, the disclosed system optionally selects an optimized rate for a multicast group including stations (operation 402), which is depicted using a dashed line to indicate it is an optional operation for the exemplary process 400. In some embodiments, the system does not have to optimize a group multicast rate. The system then measures network conditions based on one or more metrics (operation 404). The one or more metrics can be any metrics used to measure the network conditions. Airtime information can be one of the metrics indicating the state of network. For example, the system estimates airtime costs of multicast transmission and unicast transmission. Then, based on the measured network conditions, e.g., the airtime costs, the disclosed system determines whether to convert all stations in the multicast group to unicast transmission (operation 406). Other metrics that can be used to measure the network conditions include the load of the multicast group, the overall load on the LAN, the PHY rates of the clients (stations) in the multicast group, station capabilities, Overlapping Basic Service Set (OBSS) load, etc.

Further, the disclosed system determines a subset of the multicast group based on determination of not converting all stations in the multicast group to unicast (operation 408). Thus, the system converts the subset of the multicast group to unicast transmission (operation 410). In some embodiments, the system determines the subset to be converted by testing if unicast transmission is cheaper and if conversion to unicast will cause saturation. In some embodiments, the system will give slower clients a higher priority of conversion while accommodating as many clients as possible.

Figure 5:
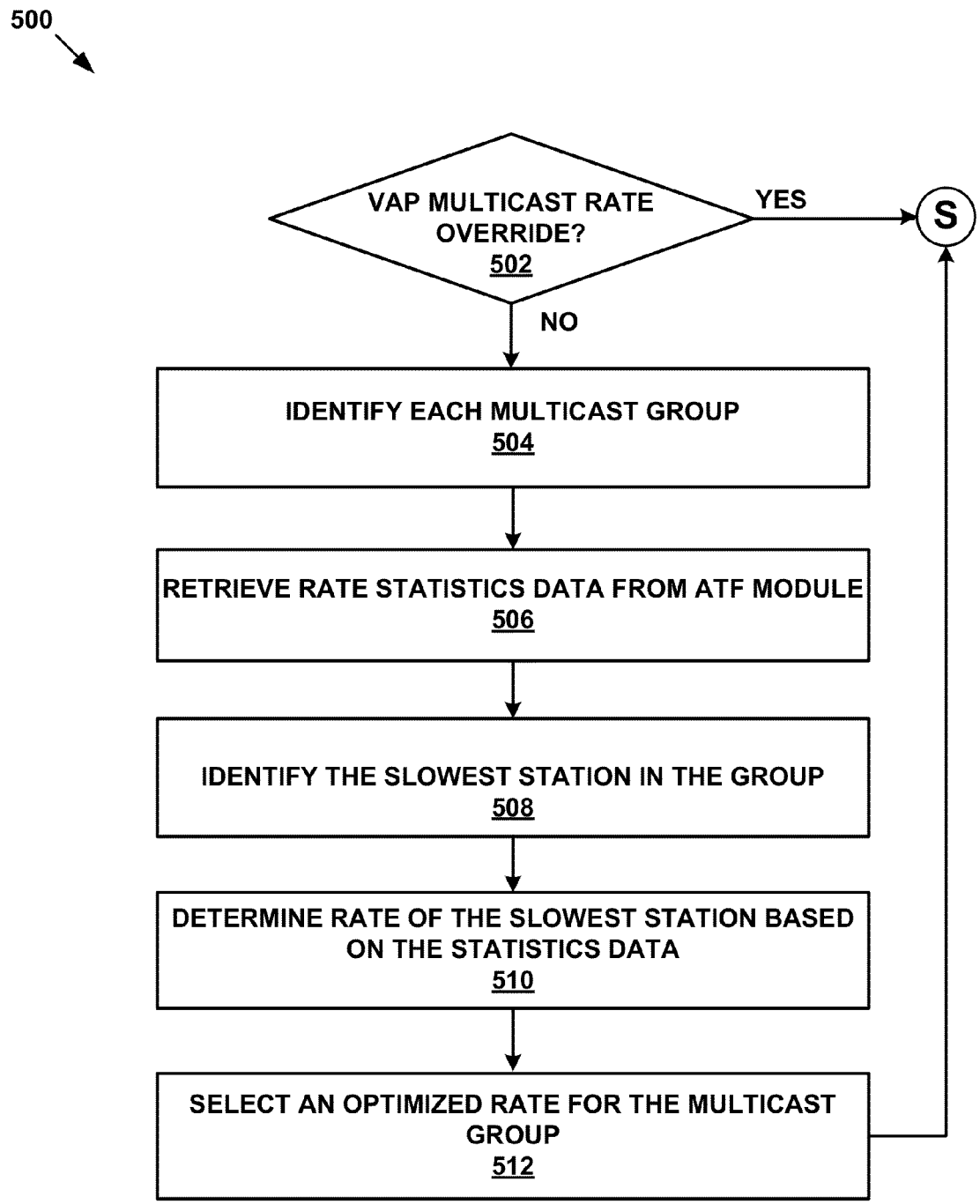
FIG. 5 illustrates an exemplary process for selecting an optimized rate according to embodiments of the present disclosure.

FIG. 5 is a flowchart illustrating an exemplary process 500 for selecting an optimized rate for the multicast group according to embodiments of the present disclosure. During operation, the disclosed system determines if a virtual access point (VAP) multicast data rate overrides (operation 502). If the system determines that a VAP multicast data rate overrides, the system continues to operate a process 600 illustrated in FIG. 6.

If the disclosed system determines that the VAP multicast data rate does not override, the system identifies each multicast group (operation 504). In some embodiments, the system sorts the multicast groups from higher to lower priority based on criteria (e.g., their access categories, number of clients in each of the groups, etc.). Further, the system retrieves rate statistics data from ATF module (not shown in the system) for each identified multicast group (operation 506). Then the system identifies the slowest station in the multicast group (operation 508) and determines data rate of the slowest station based on the statistics data (operation 510).

Moreover, the disclosed system selects an optimized data rate for the multicast group (operation 512). In some embodiments, the system uses a fraction of the slowest station's data rate as the data rate of the multicast group. In some embodiments, the system chooses the larger one of the slowest station's data rate and a preset rate value as the data rate for the multicast group. Thus, the disclosed system selects an optimized data rate for each identified multicast group. Next, the disclosed system continues to operate a process 600 illustrated in FIG. 6.

Figure 6:
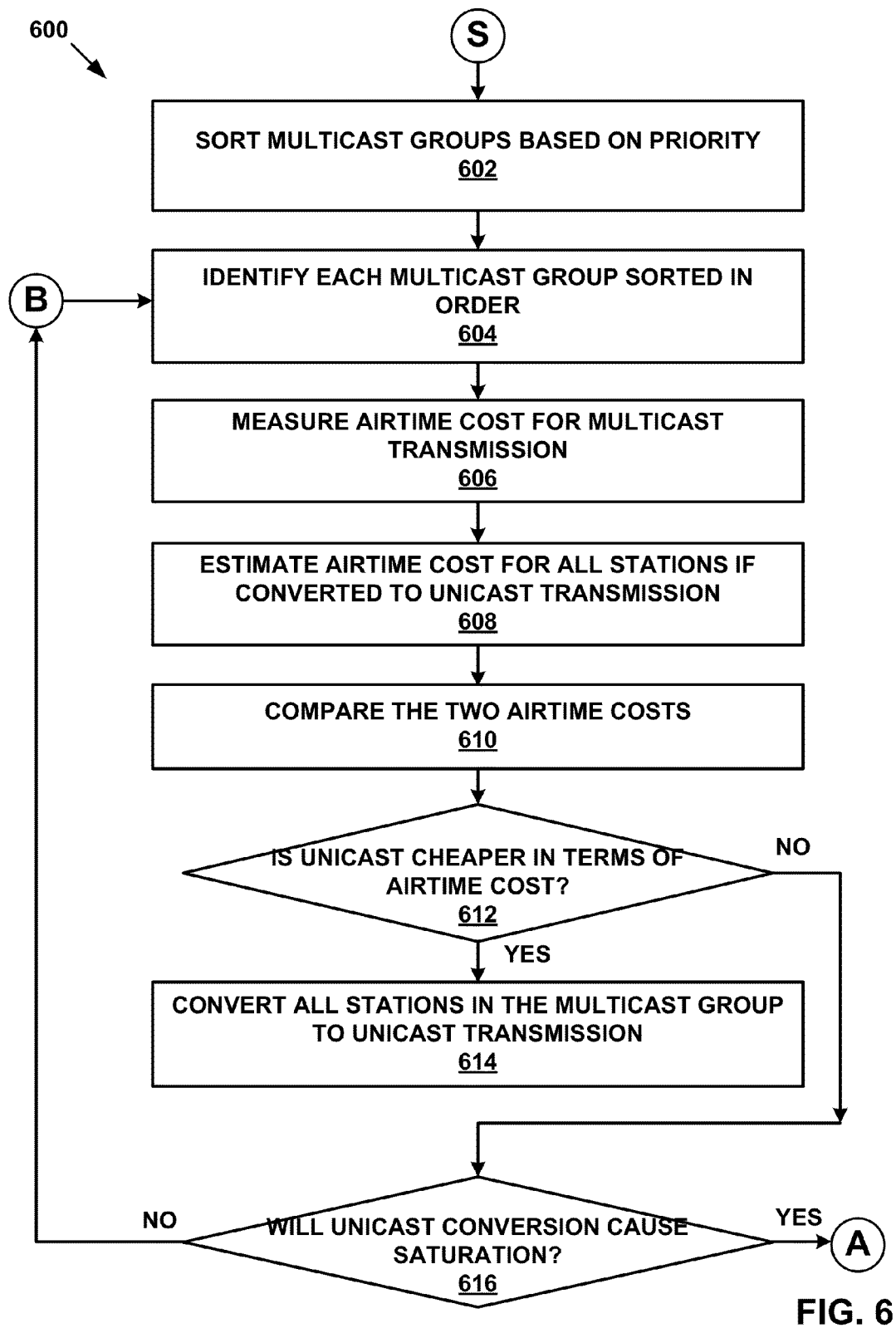
FIG. 6 illustrates an exemplary process for a full multicast-unicast conversion determination according to embodiments of the present disclosure.

FIG. 6 is a flowchart illustrating an exemplary process 600 for a full multicast to unicast conversion determination according to embodiments of the present disclosure. Specifically, FIG. 6 illustrates an exemplary full MC-UC conversion determination process 600 in which airtime cost is used as a measurement of network conditions. During operation, the disclosed system sorts multicast groups based on their priority (operation 602). The priority of the multicast groups can be determined based on one or more criteria. For example, the one or more criteria can include the access categories of the multicast groups (e.g., voice data, video data, image data, etc.), the aggregate number of clients in each of the multicast groups, the data rates of the clients in each of the multicast groups, the IP source of each multicast group, membership of certain VAPs on the AP of each of the multicast groups, the average load sustained by each of the multicast groups, other past usage characteristics, etc. In some embodiments, the operation 602 can be optional for the process 600.

Further, the disclosed system identifies each multicast group sorted in order (operation 604) and measure an airtime cost for the multicast transmission of the group (operation 606). As described above, the airtime cost for multicast transmission can be calculated using the equation (2). Then, the system estimates an airtime cost for all stations in the group if converted to unicast transmission (operation 608). The airtime cost for unicast transmission for all stations in the group can be estimated using the above-described equation (3). The system thus compares the two airtime costs (operation 610) and determines if the unicast transmission is cheaper than the multicast transmission in terms of airtime cost (operation 612). In other words, the system compares the two airtime costs and determines which airtime cost is lower than the other.

If the disclosed system determines that the unicast transmission is cheaper, then the system performs a full MC-UC conversion, e.g., converts all stations in the multicast group to unicast transmission (operation 614). If the disclosed system determines that the unicast transmission is not cheaper, the system determines if a full multicast to unicast conversion will cause saturation (operation 616). For example, the system determines whether the transmission will use up the capacity of the link if all stations are converted to unicast transmission.

If the disclosed system determines that the full unicast conversion will cause saturation, the system then continues to operate a process 700 described with reference to FIG. 7. If the disclosed system determines that the full unicast conversion will not cause saturation, the system thus returns to operation 604 and identifies the next multicast group to determine if a full MC-UC conversion is possible. In other words, for each identified multicast group, the disclosed system implements the operations from 606 to 616 to facilitate a full MC-UC conversion or to move to a partial MC-UC conversion process 700 depicted in FIG. 7.

Figure 7:
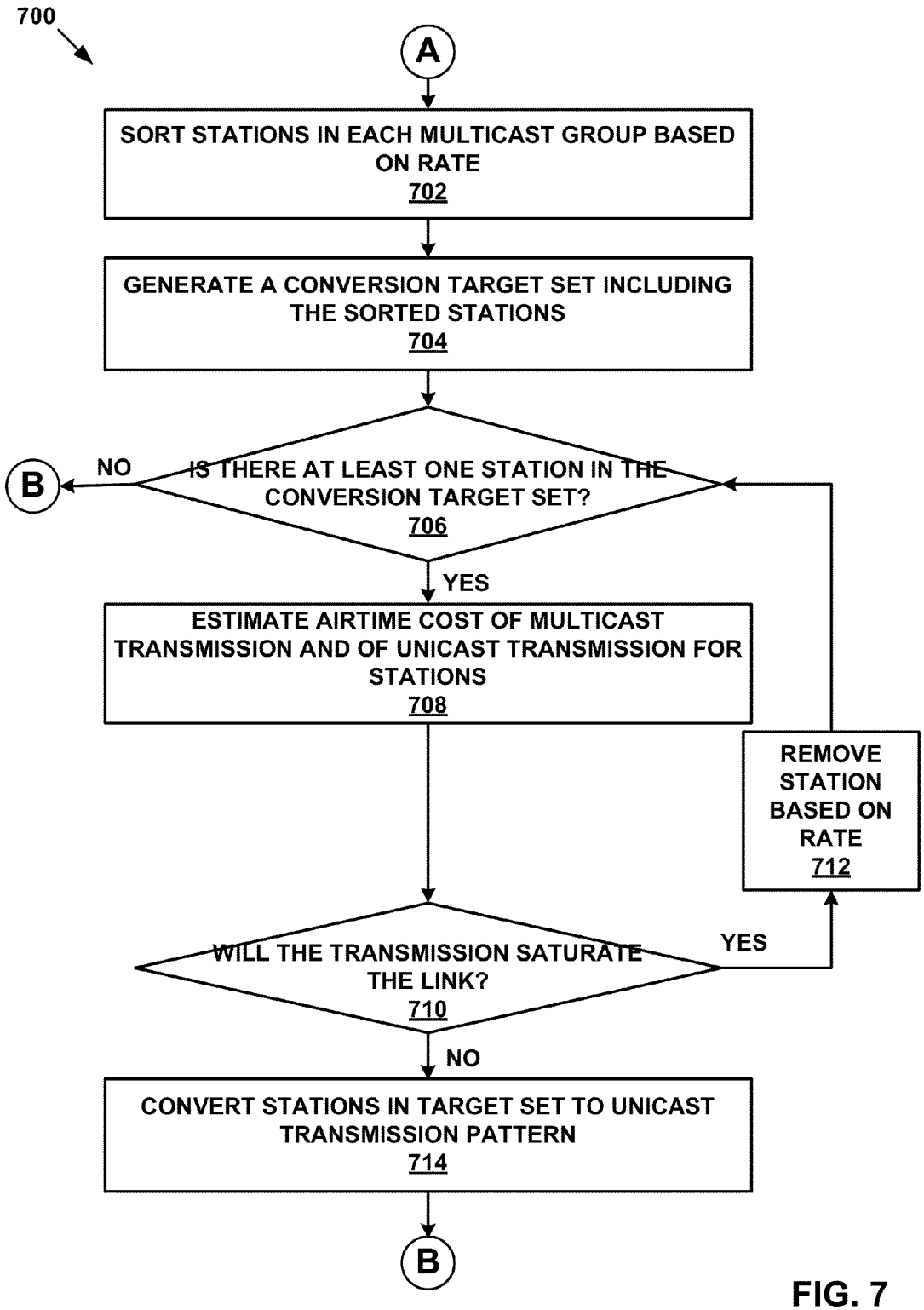
FIG. 7 illustrates an exemplary process for a partial multicast-unicast conversion according to embodiments of the present disclosure.

FIG. 7 is a flowchart illustrating an exemplary process 700 for a partial multicast-unicast conversion according to embodiments of the present disclosure. Specifically, in the partial multicast-unicast conversion process 700, airtime cost is also used as the metric to measure network conditions. However, one skilled in the relevant art will recognize that other metrics can be used to measure network conditions. During operation, the disclosed system sorts stations in each of the multicast group based on data rate (operation 702). For example, for each multicast group where a full MC-UC conversion is determined to be not possible during the process 600, the system sorts all stations in the multicast group from the slowest to the fastest in terms of data rate. Then the system generates a conversion target set including the sorted stations (operation 704). In some embodiments, the system generates a conversion target set including all stations but the fastest in the group. To do so, the system gives higher priority to slower clients and tries to accommodate faster clients if possible.

Further, the disclosed system determines if there is at least one station in the conversion target set (operation 706). If the system determines that there is no station left in the conversion target set, the system moves back to the process including operations 604-616 to determine a full MC-UC possibility for the next multicast group, which has been described in detail with reference to FIG. 6. This operation 706 can set a stopping point for the repeated process from operation 706 to operation 712 in which the fastest client will be removed from the target set gradually if a certain condition is not met. Thus, when there is no station in the set, the system determines that a partial MC-UC conversion is also not possible for the multicast group and then moves on to the next group.

If the disclosed system determines that there is at least one station in the conversion target set, the system estimates airtime cost of multicast transmission and unicast transmission for stations (operation 708). For example, the system calculates airtime cost of multicast transmission for one or more clients (stations) not in the conversion target set and unicast transmission for one or more clients (stations) in the conversion target set. The disclosed system therefore determines if the transmission will saturate the link (operation 710). In some embodiments, the system determines if there will be saturation based on the estimated airtime cost of the multicast and unicast transmission. Specifically, the system determines if the airtime cost of the multicast and unicast transmission consumes up the capacity of the link. In this way, the system can determines if a partial MC-UC conversion is possible given that the stations in the conversion target set will be converted to unicast transmission.

If the disclosed system determines that the transmission will saturate the link, the system removes one or more stations from the conversion target set based on data rate (operation 712) and moves back to operation 706. For example, the system removes one or more the fastest stations from the target set. In another example, the system removes one or more slowest stations from the target set. After operation 712, the system moves back to operation 706 to determine if there is still at least one station in the target set. Therefore, the process from operation 706 to operation 712 can then be implemented again.

The process from operation 706 to operation 712 can be performed by the system repeatedly until the system finds out a conversion target set which will not saturate the link if converted to unicast.

If the disclosed system determines that the transmission will not saturate the link, the system converts stations in the conversion target set to unicast transmission pattern (operation 714). As a result, a partial MC-UC conversion is implemented.

Graphic Representations

Figure 8:
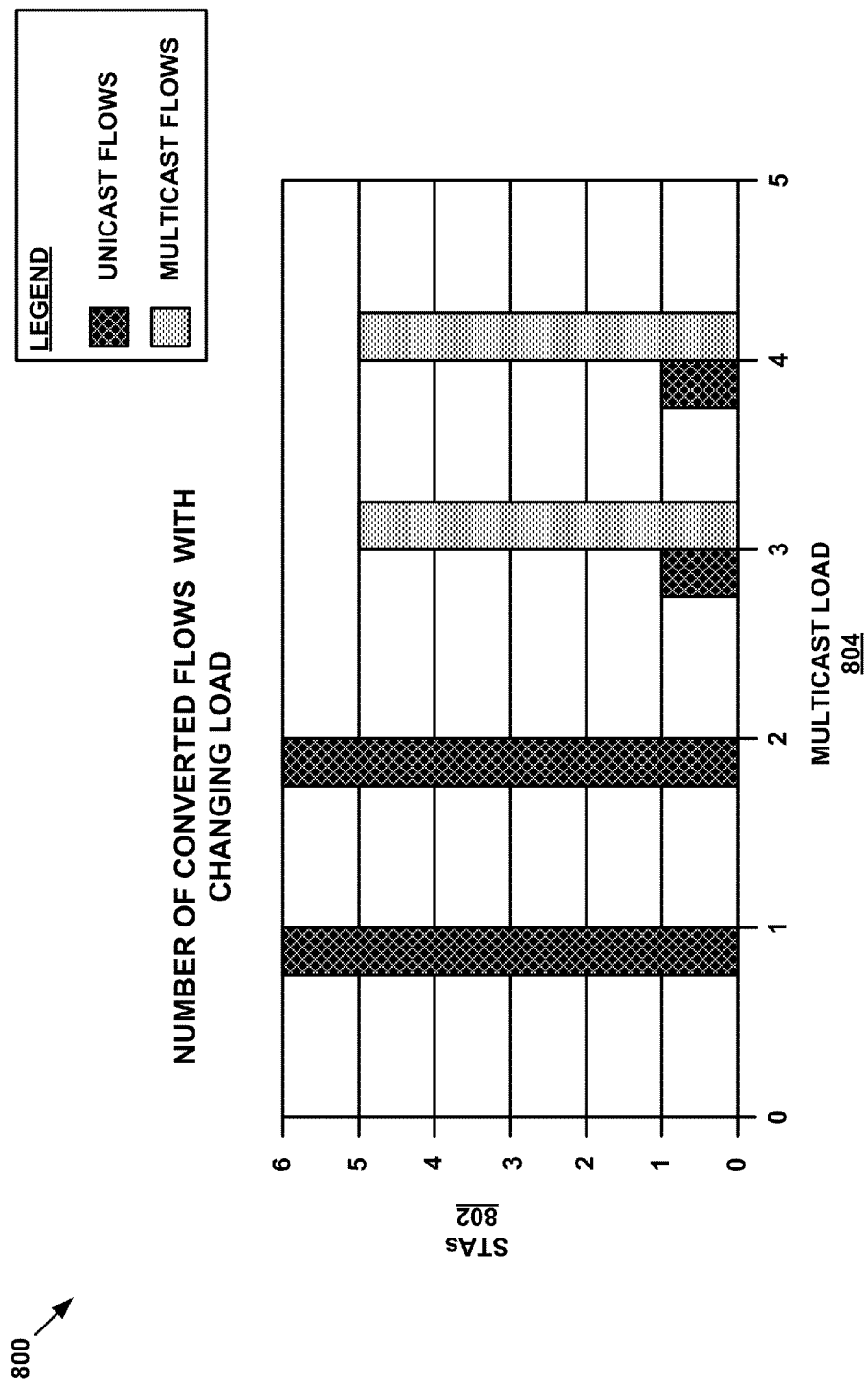
FIG. 8 is a graphic representation illustrating an experimental result of implementing enhanced dynamic multicast optimization according to embodiments of the present disclosure.

FIGS. 8 and 9 are graphic representations illustrating experimental results of implementing the enhanced dynamic multicast optimization (EDMO) according to embodiments of the present disclosure. The experimental implementation of the EDMO is performed with the following setup. There are a group of six clients associated with one access point, wherein each of the clients has different physical layer (PHY) rate. Initially, the clients associated with the group receive a multicast traffic with a 10 Mbps speed.

In one scenario, the multicast traffic (load) is increased and the result of implementing the EDMO is illustrated in FIG. 8. Referring to FIG. 8, a result graph chart 800 is illustrated showing how the number of converted flows varies with the changing load by implanting the enhanced dynamic multicast optimization (EDMO) described in the present disclosure. The result graph chart 800 includes a y-axis indicating the station (client) number 802 and an x-axis indicating the multicast load 804. Based on the chart 800, when the multicast load (the amount of multicast traffic sent to the group) 804 increases, the number of clients (stations) 802 receiving unicast traffic drops from six to one and the number of clients (stations) 802 receiving multicast traffic increases from zero to five. As seen in set 3 and 4 of the x-axis indices, five clients (stations) change from receiving unicast traffic to receiving multicast traffic.

In the next scenario, the client link condition improves and the result of implementing the EDMO is illustrated in FIG. 9. Referring to FIG. 9, a result graph chart 900 is illustrated showing how the number of converted flows varies with the changing data rate by implanting the EDMO described in the present disclosure. The result graph chart 900 includes a y-axis indicating the station (client) number 902, which is similar to that in chart 800, and an x-axis indicating the multicast rate 904, which is different from the x-axis in chart 800. Based on the chart 900, when the link conditions improves (e.g., the multicast rate increases), the number of clients (stations) 902 receiving unicast traffic increases and in the set 3 and 4 of the x-axis indices, all six clients (stations) receive unicast traffic.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising a set of instructions which, when executed by one or more hardware processors, causes performance of a set of operations comprising:
    measuring, by a network device, a network condition;
    determining, by the network device, whether to convert all stations in a multicast group to unicast based on the network condition;
    measuring a first airtime cost for multicast transmission of the multicast group;
    estimating a second airtime cost for the multicast group if all stations are converted to unicast;
    responsive to determining not to convert the all stations in the multicast group to unicast, determining, by the network device, based on the network condition, a subset of the multicast group for converting the subset of the multicast group to unicast, the subset including less than all stations in the multicast group; and
    estimating a third airtime cost for multicast transmission of one or more stations not in the subset and unicast transmission of one or more stations in the subset.

2. The computer readable medium of claim 1, wherein the measuring includes measuring a network condition for the multicast group using one or more metrics.

3. The computer readable medium of claim 2, wherein the one or more metrics include an airtime.

4. The computer readable medium of claim 1, wherein determining whether to convert the all stations to unicast comprises:
    comparing the first and second airtime costs;
    determining if the second airtime cost is lower than the first airtime cost; and
    responsive to determining that the second airtime cost is lower than the first airtime cost, converting the all stations in the multicast group to unicast.

5. The computer readable medium of claim 1, wherein determining whether to convert the all stations to unicast further comprises:

responsive to determining that the second airtime cost is not lower than the first airtime cost, determining whether converting the all stations to unicast will cause a saturation; and responsive to determining that converting the all stations to unicast will cause the saturation, determining not to convert the all stations to unicast.

6. The computer readable medium of claim 1, wherein determining the subset of the multicast group comprises:

sorting the stations in the multicast group based on their data rates;

generating the subset including less than all the stations in the multicast group based on the sorting;

determining whether the third airtime cost will cause a saturation; and responsive to determining that the third airtime cost will cause the saturation, removing one or more stations with the fastest data rate from the subset.

7. The computer readable medium of claim 1, further comprising:

sorting a set of multicast groups based on one or more criteria, the one or more criteria including priority of access categories of the multicast groups.

8. A system comprising:

a processor; and a memory storing instructions that, when executed, cause the system to:

measure, by a network device, a network condition;

determine, by the network device, whether to convert all stations in a multicast group to unicast based on the network condition;

measure, by the network device, a first airtime cost for multicast transmission of the multicast group;

estimate, by the network device, a second airtime cost for the multicast group if all stations are converted to unicast;

responsive to determining not to convert the all stations in the multicast group to unicast, determine, by the network device, based on the network condition, a subset of the multicast group for converting the subset of the multicast group to unicast, the subset including less than all stations in the multicast group; and estimate, by the network device, a third airtime cost for multicast transmission of one or more stations not in the subset and unicast transmission of one or more stations in the subset.

9. The system of claim 8, wherein the instructions to measure include instructions that, when executed, cause the system to:

measure, by the network device, a network condition for the multicast group using one or more metrics.

10. The system of claim 9, wherein the one or more metrics include an airtime.

11. The system of claim 8, wherein the instructions to determine whether to convert the all stations to unicast comprises instructions that, when executed, cause the system to:

compare, by the network device, the first and second airtime costs;

determine, by the network device, if the second airtime cost is lower than the first airtime cost; and responsive to a determination that the second airtime cost is lower than the first airtime cost, convert, by the network device, the all stations in the multicast group to unicast.

12. The system of claim 8, wherein the instructions to determine whether to convert the all stations to unicast further comprises instructions that, when executed, cause the system to:

responsive to a determination that the second airtime cost is not lower than the first airtime cost, determine, by the network device, whether converting the all stations to unicast will cause a saturation; and responsive to a determination that converting the all stations to unicast will cause the saturation, determine, by the network device, not to convert the all stations to unicast.

13. The system of claim 8, wherein the instructions to determine the subset of the multicast group comprises instructions that, when executed, cause the system to:

sort, by the network device, the stations in the multicast group based on their data rates;

generate, by the network device, the subset including less than all the stations in the multicast group based on the sorting;

determine, by the network device, whether the third airtime cost will cause a saturation; and responsive to a determination that the third airtime cost will cause the saturation, remove, by the network device, one or more stations with the fastest data rate from the subset.

14. The system of claim 8, wherein the instructions cause the system further to:

sort a set of multicast groups, by the network device, based on one or more criteria, the one or more criteria including priority of access categories of the multicast groups.

* * * * *